Patented Jan. 16, 1951

2,538,104

UNITED STATES PATENT OFFICE 2,538,104

GLUTAMYL-GLUTAMYL-GLUTAMIC ESTERS

Frank R. Koniuszy, Rahway, and Karl Folkers, Plainfield, N. J., assignors to Merck & Co., Inc., Rahway, N. J., a corporation of New Jersey No Drawing. Application December 1, 1948, Serial No. 62,983

5 Claims. (Cl. 260—482)

This invention relates to novel long chain glutamyl peptides having growth-promoting activity for certain organisms. More particularly, it relates to intermediates in the synthetic manufacture of pteroyl-glutamyl-glutamic acid and pteroyl-glutamyl-glutamyl-glutamic acid, pterin-like acidic chemical compounds which possess folic acid activity. One of the isomeric pteroyl-glutamyl-glutamyl-glutamic acids has been reported as having value in the palliative treatment of certain types of cancer.

Pteroyl-glutamyl-glutamic acid and pteroyl-glutamyl-glutamyl-glutamic acid may be chemically represented respectively as follows:

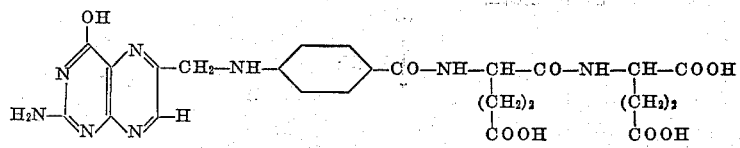

and

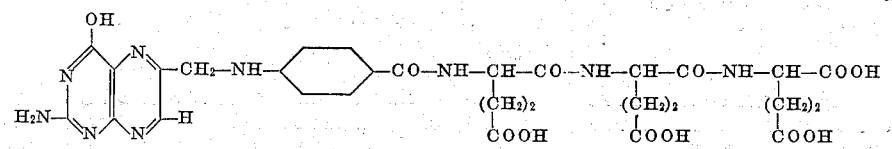

It has been discovered that pteroyl-glutamyl-glutamic acid can be prepared by reacting a pteroyl halide with the trimethyl ester of glutamyl-glutamic acid and hydrolyzing the pteroyl-glutamyl-glutamic ester thus formed; and that pteroyl glutamyl-glutamyl-glutamic acid can be prepared by reacting a pteroyl halide with the tetramethyl ester of glutamyl-glutamyl-glutamic acid and hydrolyzing the pteroyl glutamyl-glutamyl-glutamic ester thus formed.

The present invention is concerned with the trimethyl ester of glutamyl-glutamic acid, with the tetramethyl ester of glutamyl-glutamyl-glutamic acid and with the process for preparing said esters from readily available starting materials. It is also concerned with the intermediate compounds utilized in said process.

We have found that the trimethyl ester of glutamyl-glutamic acid can be prepared by reactions which can be chemically represented as follows:

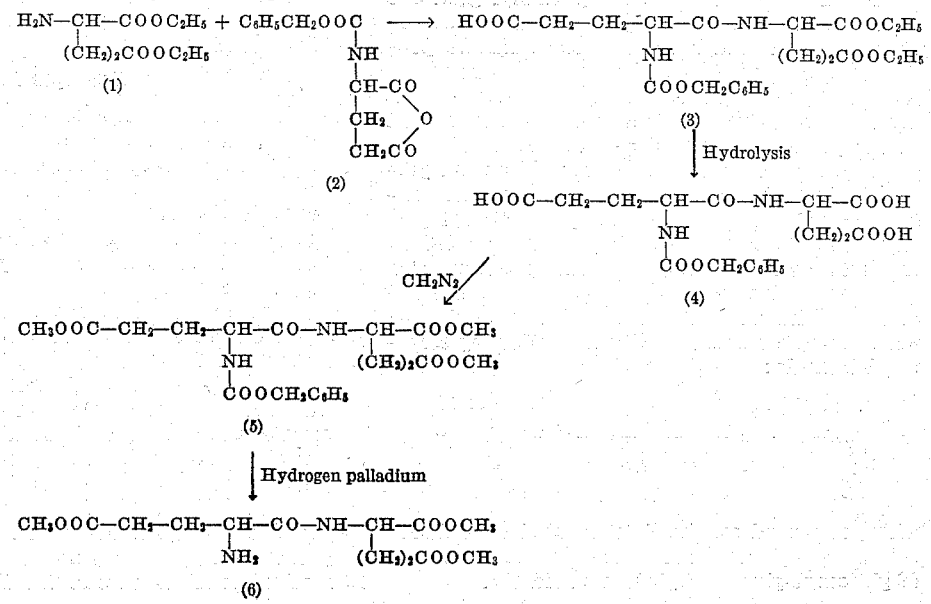

The reactions indicated above are conducted as follows:—Diethyl glutamate (compound 1 above) is reacted under anhydrous conditions in chloroform solution with carbobenzoxy-glutamic anhydride (2) to produce the diethyl ester of N-carbobenzoxy-glutamyl-glutamic acid (3). This ester is hydrolyzed by treatment with aqueous sodium hydroxide and the hydrolyzed product acidified to produce N-carbobenzoxy-glutamyl-glutamic acid (4). This compound is then treated with diazomethane in ether solution to produce the trimethyl ester of N-carbobenzoxy-glutamyl-glutamic acid (5), which is then reacted with hydrogen in the presence of palladium oxide hydrogenation catalyst to produce the desired trimethyl ester of glutamyl-glutamic acid (6).

The tetramethyl ester of glutamyl-glutamyl-glutamic is prepared from compound 6 by reactions which may be chemically represented as follows:

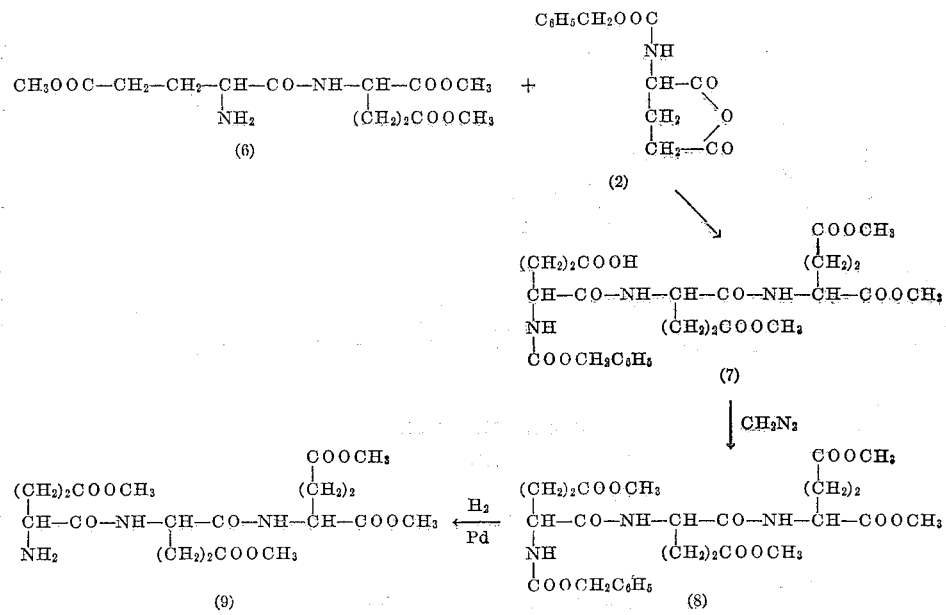

The reactions indicated above are conducted as follows: the trimethyl ester of glutamyl-glutamic acid is reacted in chloroform solution under anhydrous conditions with carbobenzoxy-glutamic anhydride thereby forming the trimethyl ester of N-carbobenzoxy-glutamyl-glutamyl-glutamic acid (7). The latter compound is then reacted with an ether solution of diazomethane to produce the tetramethyl ester of N-carbobenzoxy-glutamyl-glutamyl-glutamic acid (8), which is then hydrogenated by treatment with hydrogen in the presence of a palladium oxide catalyst to produce the tetramethyl ester of glutamyl-glutamyl-glutamic acid (9). Alternatively the trimethyl ester of N-carbobenzoxy-glutamyl-glutamyl-glutamic acid (7) can be hydrogenated by treatment with hydrogen in the presence of a palladium oxide catalyst to produce the trimethyl ester of glutamyl-glutamyl-glutamic acid (10) which can be represented by the following structural formula:

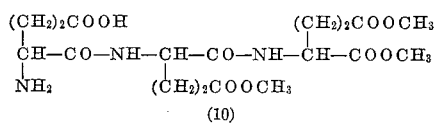

This compound can be then reacted with diazomethane to produce the desired tetramethyl ester of glutamyl-glutamyl-glutamic acid (9).

The following examples illustrate methods of carrying out the present invention, but it is to be understood that these examples are given by way of illustration and not of limitation.

Example 1

N-carbobenzoxy-d-glutamyl-d-glutamic acid is prepared by reacting diethyl-d-glutamate with carbobenzoxy-d-glutamic anhydride in chloroform solution to produce the diethyl ester of N-carbobenzoxy-d-glutamyl-glutamic acid which is then reacted with sodium hydroxide followed by acidification. 3 grams of moist N-carbobenzoxy-d-glutamyl-d-glutamic acid (containing about 3.3% water) was dissolved in a mixture of 50 ml. of methanol and 100 ml. of ethyl ether and the resulting solution was treated with a slight excess of ethereal diazomethane. The reaction solution was evaporated to dryness in vacuo and the residual material was dissolved in 200 ml. of chloroform, washed twice with 50 ml. portions of 3% aqueous sodium bicarbonate solution, once with 50 ml. of water and then concentrated to dryness in vacuo to produce the trimethyl ester of N-carbobenzoxy-d-glutamyl-d-glutamic acid; M. P. 112° C. Anal. calc'd. for $C_{21}H_{28}N_2O_9$: C, 55.79; H, 6.24; N, 6.19. Found: C, 55.99; H, 6.04; N, 6.55.

Example 2

3.89 gms. of the trimethyl ester of N-carbobenzoxy-d-glutamyl-d-glutamic acid was dissolved in 100 ml. of methanol containing 0.31 gm. of hydrogen chloride and the solution was reduced catalytically with hydrogen over a palladium oxide catalyst. Only one molecular equivalent of hydrogen was absorbed. The reaction solution was then filtered from the catalyst, evaporated to dryness and the residual material was dissolved in ice cold water. The pH of this solution was 3.5. The aqueous solution was then washed twice with 25 ml. portions of chloroform. The aqueous solution was then neutralized by portionwise addition of sodium bicarbonate followed by extraction with chloroform until the pH of the solution was 8.0. The chloroform extract was filtered and evaporated to dryness to produce 2.45 gms. of the trimethyl ester of d-glutamyl-d-glutamic acid which was obtained as a colorless oil with an amine-like odor.

Example 3

2.45 gms. of the trimethyl ester of d-glutamyl-d-glutamic acid was dissolved in 100 ml. of dry chloroform and to this solution was added a solution containing 2.02 gms. of carbobenzoxy-glutamic anhydride dissolved in 150 ml. of dry chloroform. The resulting mixture was allowed to stand at room temperature for 5 hours and the chloroform reaction solution was then washed twice with dilute hydrochloric acid. The chloroform extract was evaporated to dryness and the residual material crystallized from methanol-petroleum ether to produce 3.2 gms. of the trimethyl ester of N-carbobenzoxy-d-glutamyl-d-glutamyl-d-glutamic acid; M. P. 159° C. Anal. calc'd. for $C_{26}H_{35}N_3O_{12}$: C, 53.69; H, 6.06; N, 7.22. Found: C, 53.98; H, 6.36; N, 7.19.

Example 4

A solution of 822 mg. of the trimethyl ester of N-carbobenzoxy-d-glutamyl-d-glutamyl-d-glutamic acid in methanol-ethyl ether, was treated with an ether solution containing about 60 mg. of diazomethane. The reaction solution was then evaporated to dryness and the residual material was dissolved in 25 ml. of chloroform and the chloroform solution washed three times with 25 ml. portions of 5% aqueous sodium bicarbonate solution and once with 25 ml. of water. The chloroform extract was then evaporated to dryness to produce 800 mg. of crude product which was purified by recrystallization from methanol-petroleum-ether solution to yield 645 mg. of the tetramethyl ester of N-carbobenzoxy-d-glutamyl-d-glutamyl-d-glutamic acid; M. P. 112° C. Anal. calc'd. for $C_{27}H_{37}N_3O_{12}$: C, 54.49; H, 6.26; N, 7.02. Found: C, 54.37; H, 6.14; N, 7.04.

The tetramethyl ester of N-carbobenzoxy-tetramethyl-d-glutamyl-d-glutamyl-d-glutamic acid is reacted with hydrogen, said reaction being carried out in methanol containing a small amount of hydrogen chloride and in the presence of a palladium oxide catalyst, to produce the tetramethyl ester of d-glutamyl-d-glutamyl-d-glutamic acid.

Example 5

A solution of 928 mg. of the trimethyl ester of N-carbobenzoxy-d-glutamyl-d-glutamyl-d-glutamic acid in 100 ml. of methanol containing a small amount of hydrogen chloride was reacted with hydrogen in the presence of a palladium oxide catalyst. The reaction solution was filtered to remove the catalyst and the solution was evaporated to dryness. The residual material was dissolved in 25 ml. of water (pH 3.5) and the aqueous solution was then neutralized by the portionwise addition of sodium bicarbonate, followed by extraction with chloroform after each addition of sodium bicarbonate, until the aqueous solution had a pH of 8.0. The chloroform extracts were combined, filtered, and then evaporated to dryness to produce 272 mg. of crude product which was purified by recrystallization from methanol-petroleum ether to yield substantially pure trimethyl ester of d-glutamyl-d-glutamyl-d-glutamic acid; M. P. 99° C.

This product is reacted with ethereal diazomethane to produce the tetramethyl ester of d-glutamyl-d-glutamyl-d-glutamic acid.

Various changes and modifications may be made in carrying out the present invention without departing from the spirit and scope thereof. Insofar as these changes and modifications are within the purview of the annexed claims, they are to be considered as part of our invention.

We claim:

1. Glutamyl-glutamyl-glutamic esters having the formula:

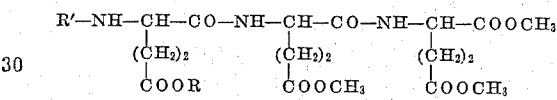

wherein R is a radical selected from the class which consists of hydrogen and methyl radicals, and R' is a radical selected from the class which consists of hydrogen and carbobenzoxy radicals.

2. The trimethyl ester of N-carbobenzoxy-d-glutamyl-d-glutamyl-d-glutamic acid.

3. The tetramethyl ester of N-carbobenzoxy-d-glutamyl-d-glutamyl-d-glutamic acid.

4. The trimethyl ester of d-glutamyl-d-glutamyl-d-glutamic acid.

5. The tetramethyl ester of d-glutamyl-d-glutamyl-d-glutamic acid.

FRANK R. KONIUSZY.
KARL FOLKERS.

REFERENCES CITED

The following references are of record in the file of this patent:

FOREIGN PATENTS

| Number | Country | Date |
|---|---|---|
| 556,798 | Germany | Aug. 13, 1932 |